United States Patent [19]
Kelley et al.

[11] Patent Number: 4,708,305
[45] Date of Patent: Nov. 24, 1987

[54] HELICOPTER ANTI-TORQUE SYSTEM USING FUSELAGE STRAKES

[75] Inventors: Henry L. Kelley; John C. Wilson, both of Newport News, Va.

[73] Assignee: The United States of America as represented by the Administrator of the National Aeronautics and Space Administration, Washington, D.C.

[21] Appl. No.: 8,895

[22] Filed: Jan. 30, 1987

[51] Int. Cl.⁴ .......................... B64C 5/06; B64C 27/06
[52] U.S. Cl. ..................... 244/17.19; 244/91
[58] Field of Search .................... 244/91, 17.11, 17.21, 244/17.19

[56] References Cited

U.S. PATENT DOCUMENTS

| | | | |
|---|---|---|---|
| 2,338,935 | 1/1944 | Hafner | 244/17.19 |
| 2,674,421 | 4/1954 | De Cenzo | 244/17.19 |
| 2,959,373 | 11/1960 | Zuck | 244/17.19 |
| 3,540,680 | 11/1970 | Peterson | 244/17.19 |
| 3,807,662 | 4/1974 | Velazquez | 244/17.19 |
| 4,200,252 | 4/1980 | Logan et al. | 244/17.19 |
| 4,227,665 | 10/1980 | Carlson et al. | 244/17.11 |

OTHER PUBLICATIONS

Brocklehurst et al., EPA #0099185, published 1/25/84.

Primary Examiner—Galen Barefoot
Attorney, Agent, or Firm—George F. Helfrich; John R. Manning

[57] ABSTRACT

A helicopter 10 with a system for controlling mainrotor torque which reduces the power and size requirements of conventional anti-torque means. The torque countering forces are generated by disrupting the main rotor downwash flowing around the fuselage. The downward flow is separated from the fuselage surface 11 by strakes 16 and 17 positioned at specified locations on the fuselage 11. These locations are determined by the particular helicopter wash pattern and fuselage configuration, generally being located 30° before top dead center 21 and 30° from bottom dead center 22 on the fuselage side to which the main rotor blade 12 approaches during rotation. The strakes 16 and 17 extend along the fuselage 11 from the cabin section 18 to the aft end and can be continuous or separated for aerodynamic surfaces such as a horizontal stabilizer 15.

19 Claims, 10 Drawing Figures

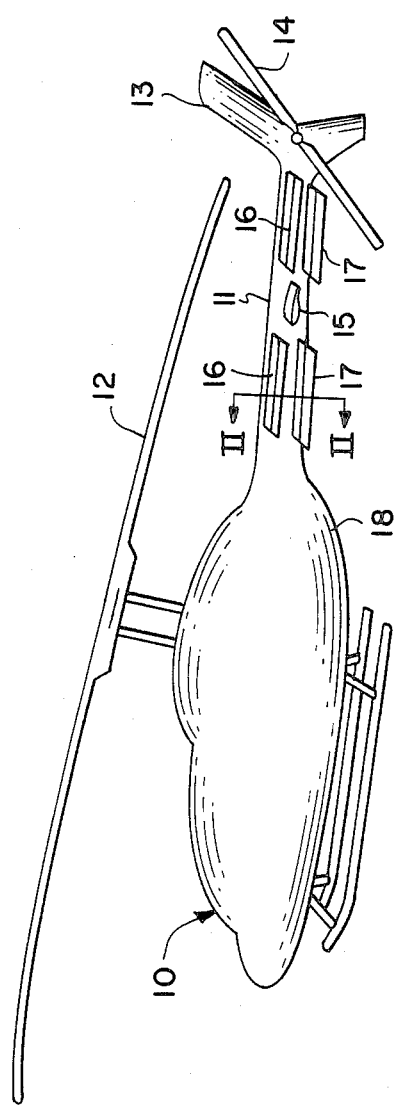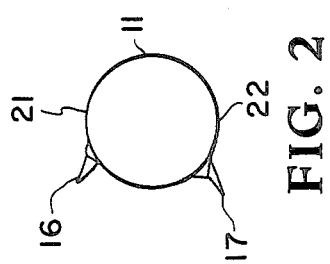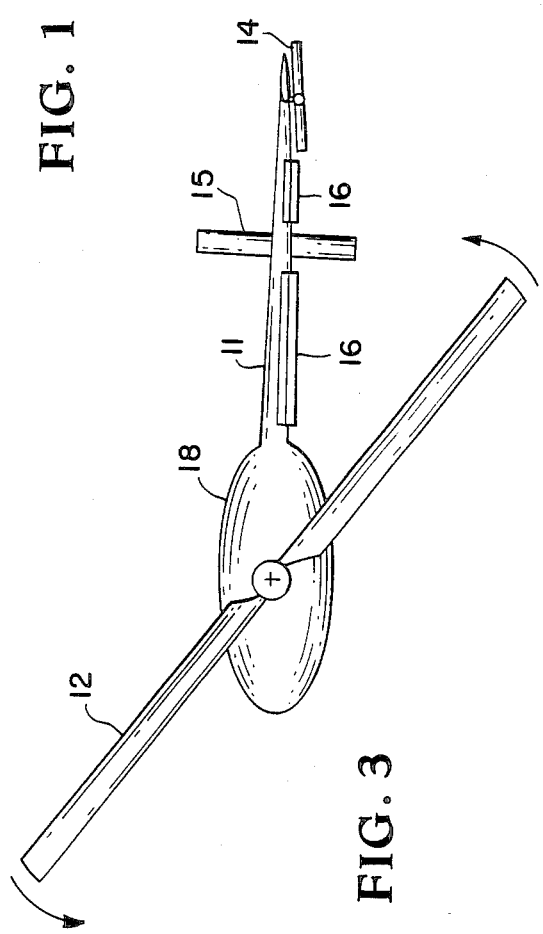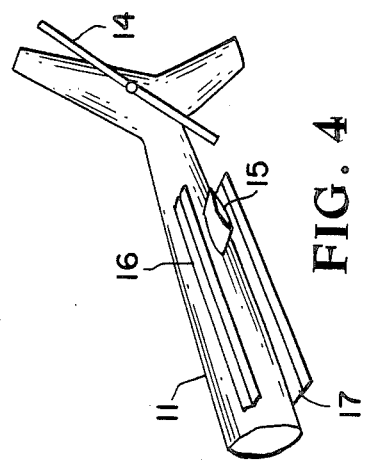
FIG. 1
FIG. 2
FIG. 3
FIG. 4

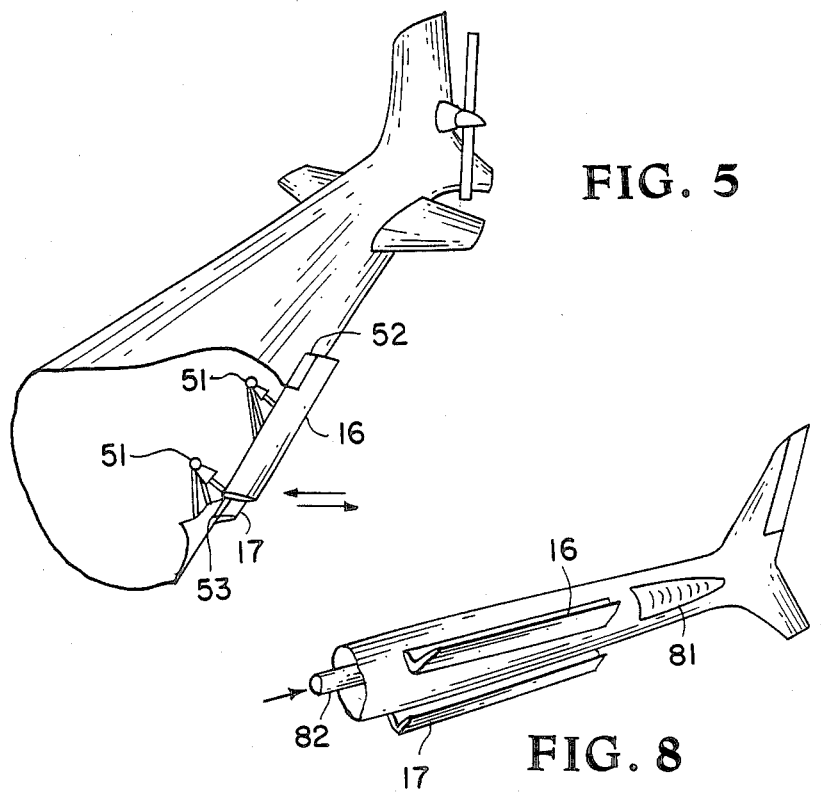
FIG. 5
FIG. 8
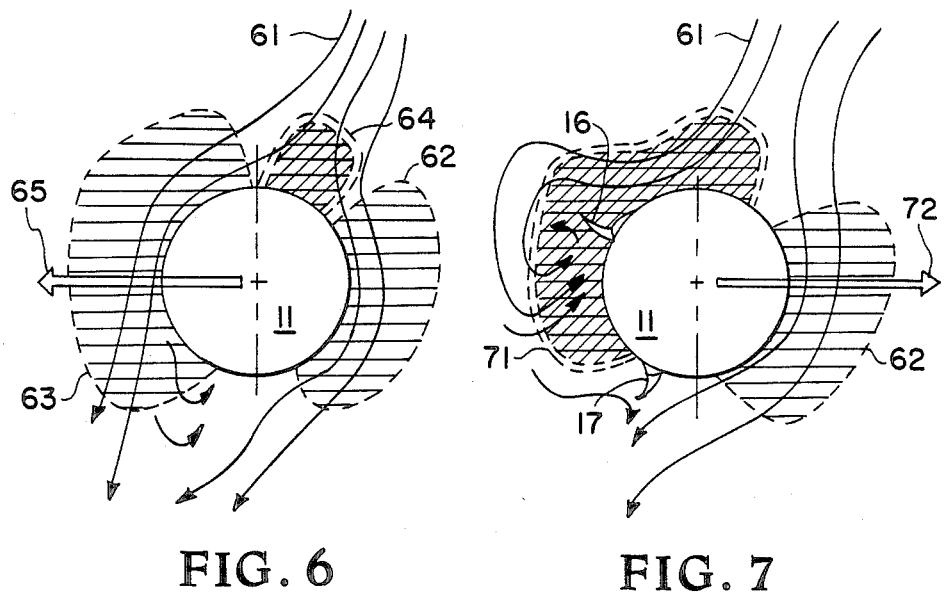
FIG. 6
FIG. 7

HELICOPTER ANTI-TORQUE SYSTEM USING FUSELAGE STRAKES

ORIGIN OF THE INVENTION

The invention described herein was made by employees of the United States Government and may be used by or for the Government for governmental purposes without the payment of any royalties thereon or therefor.

This patent application is related to assignee's copending application, Ser. No. 649,329, which was filed Sept. 11, 1984.

BACKGROUND OF THE INVENTION

This invention relates to helicopters, and more particularly to the improvement of the helicopter torque control system.

At low to medium forward speeds, helicopter performance is limited by the effectiveness of the means for counteracting main rotor torque and controlling sideslip air loads. In order to provide sufficient torque control and adequate sideslip ability, most prior designs have employed a combination of tail fin and a relatively large, power consuming, tail rotor. The problems associated with the use of this type tail rotor are well documented in the prior art. The foremost problem is the hazard presented by the tail rotor, particularly to ground personnel. Additionally, in military helicopters, the tail rotor is vulnerable to combat damage which can result in catastrophic loss of control of the helicopter. Also, the reliability and maintainability problems of a tail rotor, with its gearboxes, bearings, and drive shafts, are severe. Further, during high speed flight the tail rotor requirement can be reduced, since yaw control can be provided by aerodynamic surfaces. However, the typical tail rotor continues to use excessive engine power and to produce adverse drag effects.

In order to avoid these problems, efforts have been made to eliminate tail rotors. In U.S. Pat. No. 4,200,252 (Logan) and earlier referenced patents, helicopter anti-torque systems are disclosed which employ the principles of fuselage circulation control using the main rotor downwash. These inventions describe how exhaust or other engine-driven air may be ducted into the helicopter aft fuselage section and then be injected tangential to the fuselage in order to induce more circulation. This increase in circulation is achieved by use of main rotor downwash to produce additional lateral forces on the fuselage which oppose main rotor torque.

However, it is established in prior art that main rotor downwash does not flow over the fuselage during high speed flight. The forward velocity of the helicopter moves the fuselage clear before the wash can reach it. Viewed from within the helicopter, the downwash pattern appears to have a large rearward horizontal component. Thus, a supplemental means of directional control, other than circulation control alone, is necessary. These supplemental means include tail rotors, aerodynamic fins, and reaction jets.

Two U.S. patents specifically address circulation control, Logan supra and U.S. Pat. No. 3,807,662. Both of these patents contemplate increasing the favorable lateral forces on the helicopter fuselage. These types of devices result in increased complexity and weight. The ducting, plenum and nozzle arrangements require considerable redesign and modification of the helicopter. Further, the possibility of mechanical failure and the increased vulnerability in the case of a military helicopter remain inherent deficiencies.

Accordingly, it is an object of the present invention to provide upper and lower fuselage strakes which will beneficially alter the air flow around the helicopter tail boom.

It is a further object of the present invention to reduce the load requirements on the helicopter torque control means.

Yet another object of the invention is to reduce the size of the helicopter torque control means by using fuselage air loads to provide part of the needed torque control.

A further object of the invention is to increase helicopter sideslip ability by controlling air flow circulation around the fuselage.

Another object of the invention is to provide a retraction/extension mechanism whereby the strakes may be positioned for optimal performance.

A further object of the invention is to prevent interference between aerodynamic surfaces by providing segmented strakes.

Another object of the invention is to provide improved reliability and maintainability for the helicopter torque control means by reducing power and load requirements.

Still another object of the present invention is to improve helicopter performance through increased speed, increased fuel savings and increased load capacity by decreasing power required from the torque control, by decreasing drag inherent in the torque control, and by reducing weight of the torque control means.

SUMMARY OF THE INVENTION

These and other objects of the invention are achieved by providing two fuselage mounted strakes, fabricated of metal or other suitable material. The strakes are mounted both on the same side of the aft fuselage section, one above the other. For single-rotor helicopters whose main rotor rotates counter-clockwise as viewed from above (as in the U.S.) one of the strakes would be mounted in the upper left-hand quadrant (viewed from the rear of the aircraft) and the second in the lower left-hand quadrant. The strakes alter the air flow around the fuselage by separating the flow so as to produce lateral air loads on the tail boom which oppose main-rotor torque. The upper strake operates in a right crosswind to oppose main-rotor torque, and the lower strake has effect in left crosswinds. This result is achieved in a converse manner to prior methods, the present method being to reduce or reverse adverse air loads by spoiling the air flow over the tail boom. For example, in an effective right crosswind the loads on the main-rotor-blade-approach side of the fuselage are reduced, whereas prior methods have achieved similar results by directly increasing favorable forces on the opposite side of the fuselage. Control of circulation around the fuselage is a subtle aerodynamic phenomenon which is greatly affected by minor changes in configuration. The effect can be dramatic, sometimes changing a low pressure region to a high pressure one. Successful circulation control depends on many parameters including the direction and speed of the flow, the cross-section of the fuselage, and the strake location, orientation and size. The strakes are to some degree analogous to a catalyst in that small strake changes can create substantial changes in the flow field/fuselage interactions.

The present invention interrupts air flow over the fuselage resulting in flow separation. Once separated, the flow no longer produces lateral lifting in the unfavorable direction. Achieving this effect requires no internal ducting, no drives or mechanisms, and no engine power. The only additions are two small strips extending along the fuselage exterior. This addition can be easily attached to existing helicopters at little expense.

BRIEF DESCRIPTION OF THE DRAWINGS

FIG. 1 is a perspective view of a representative helicopter having two attached fuselage strakes according to the present/invention;

FIG. 2 is a sectional view taken along lines II—II of the helicoper fuselage and the attached strakes of FIG. 1;

FIG. 3 is a top view of the helicopter showing the strake location with a break at the horizontal stabilizer;

FIG. 4 is an alternate configuration showing a side view of the strakes without a break for the horizontal stabilizer;

FIG. 5 is a perspective view of the fuselage strakes showing the attachment of actuators;

FIG. 6 is a schematic depiction of downwash flow patterns in a right crosswind around the helicopter fuselage without the strakes:

FIG. 7 is a schematic depiction of downwash flow patterns in a right crosswind around the fuselage with the strakes installed:

FIG. 8 shows an alternate torque control means using a lateral-thrusting jet in conjunction with the present invention to achieve the necessary torque control;

DETAILED DESCRIPTION OF THE INVENTION

Figure 9:
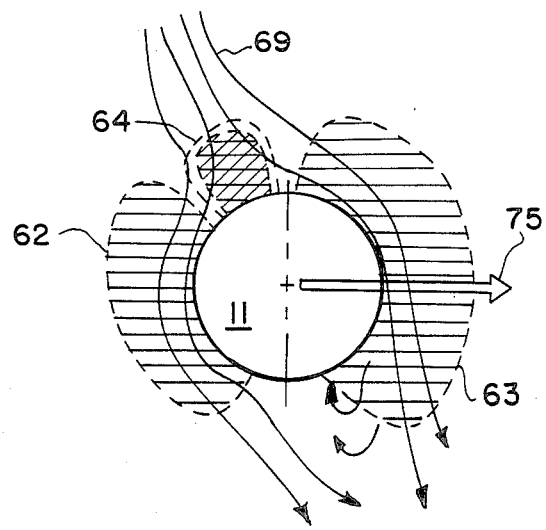
FIG. 9 is a schematic depiction of downwash flow patterns in a left crosswind around the fuselage without the strakes installed.

FIG. 1 shows a representative helicopter designated generally by the reference numeral 10 comprising a cabin fuselage section 18 and the boom or aft fuselage section 11 with a main rotor 12. Attached to the aft fuselage is the upper and lower vertical fin 13, and a torque control means 14 in this embodiment shown as a tail rotor. A horizontal stabilizer 15 may be part of the design or may be absent. The present invention is the combination of two strakes 16 and 17 shown in a representative configuration wherein a break is provided for the horizontal stabilizer.

The upper strake 16 is angularly displaced approximately 30° from top dead center (TDC) 21 of the fuselage as shown in FIG. 2, a cross-sectional view along line II—II from FIG. 1. The lower strake 17 is angularly displaced approximately 30° from bottom dead center 22 as also shown in FIG. 2.

The location of the strakes are also shown in FIG. 3. The upper strake 16 of the present invention is located on the upper left quadrant of the aft fuselage 11 facing the approaching rear main rotor blade 12. The lower strake 17 is located below upper strake 16 on the lower left quadrant of the aft fuselage 11.

FIG. 4 shows an alternate embodiment wherein the upper strake 16 and the lower strake 17 extend, without breaks, around the horizontal stabilizer 15 to the end of aft fuselage section 11. Small tail rotor 14 is attached to the aft fuselage. A further alternative embodiment is depicted in FIG. 5 wherein the strakes are retractable by use of actuators 51. Slots 52 and 53 are sealed by a rubber flap or other suitable means when the strakes are retracted.

FIG. 8 is a depiction of an additional torque control means using ducted air jets 81 powered by pressurized air 82 as a replacement for the tail rotor 14. This jet would require less power, and would be lighter when used in combination with the present invention, than designs of the prior art.

OPERATION OF THE INVENTION

The present invention uses main-rotor downwash and apparent right or left crosswinds over the tail boom to create or increase a lateral component of force to oppose the main rotor torque. The apparent crosswind arises due to side motion of the helicopter, actual wind forces or a combination of both.

During operation at low forward speeds, downwash over the fuselage (apparent right crosswind) is at its maximum. This is when torque control requirements are the highest. Also, during lateral translational flight in the direction of main-rotor-blade passage over the aft fuselage (also a right crosswind), the anti-torque requirement is substantially increased. It is in these conditions that the upper strake 16 has its maximum effect, substantially increasing the operational evelop of conventional helicopters.

During operation in lateral translational flight in the direction opposite of main-rotor-blade passage over the aft fuselage (left crosswind), the lower strake 17 takes effect to significantly augment the naturally occurring air load, in order to provide increased anti-torquing force. Thus, the present invention provides significant expansion of the total operational envelope for conventional helicopters.

Flow conditions around the aft fuselage are ideal for providing forces to counter main-rotor torque. The result of the double strake combination is unlike the effects of a standard design where fuselage forces often aggravate the torque control problem. The resulting effects may be seen by a comparison of flow patterns around the helicopter aft fuselage with and without the strakes. FIG. 6 is a schematic representation of air loads on an aft fuselage section in a right crosswind without the strakes installed. Main-rotor downwash 61 flows around aft fuselage section 11 creating low pressure areas 62 and 63 and a high pressure area 64. The resulting air load provides a component of force which acts in the same direction as main-rotor torque, i.e., an adverse force 65 depicted by the vector.

By comparison, FIG. 7 shows a schematic representation of the air loads on an aft fuselage section in a right crosswind with the strakes 16 and 17 installed. Main-rotor downwash 61 flows around aft fuselage section 11 as before, but is deflected by strake 16 and separates from the aft fuselage surface. This separation creates a high pressure area 71 in place of the previous low pressure area. The resulting air load now provides a favorable force, depicted as net lateral load 72, acting opposite to the direction of main-rotor torque. As a result of the reversal of air loads on the helicopter fuselage, a tail rotor or other torque countering device may be reduced in size or loading.

FIG. 9 is a schematic representation of air loads on an aft fuselage section in a left crosswind without the strakes installed. Left crosswind flow 69 moves around aft fuselage section 11 creating low pressure areas 62 and 63 and a high pressure area 64. The resulting air load provides a small component of force 75 which acts to counter the main-rotor torque.

Figure 10:
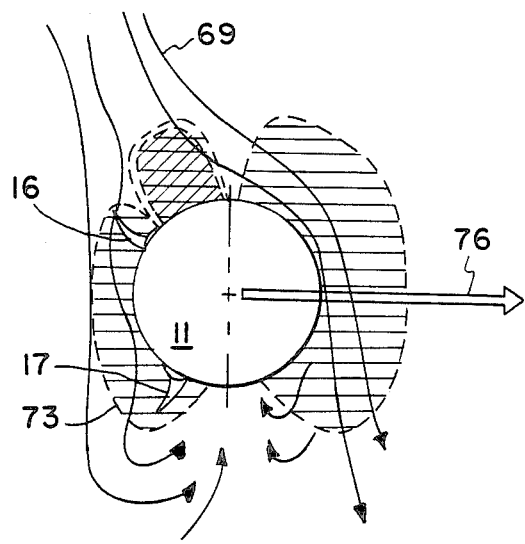
FIG. 10 is a schematic depiction of downwash flow patterns in a left crosswind around the fuselage with the strakes installed.

Again, by comparison, FIG. 10 shows a schematic representation of the air loads on an aft fuselage section in a left crosswind with the strakes 16 and 17 installed. Here, left crosswind flow 69 moves around aft fuselage section 11 as before, but is deflected by strake 17 and separates from the aft fuselage surface. This separation reduces the low pressure area 73 in place of the previous low pressure area. The resulting air load increases the existing anti-torquing force to create a significantly larger net force 76 to counter main-rotor torque. Wind tunnel testing has indicated that reductions in tail rotor loads of 5 to 30 percent may be possible for three different helicopter types. In a new design helicopter, the expected unloading would allow a reduction in tail-rotor disc area of approximately twenty to forty percent.

The flow pattern over the fuselage is changed by the helicopter velocity, yaw angle and main-rotor loading. FIG. 5 shows an arrangement to adjust the extension and retraction position of the strakes. For example, the strakes may operate with rudder pedal displacement so as to retract the upper strake 16 during left sideslip, deploy it partially during hover, and extend it fully during right sideslip. Conversely, the lower strake 17 may be extended during left sideslip and retracted at other times. A dynamic pressure sensor can attenuate strake movement as forward velocity increases so that as the airspeed exceeds forty to sixty knots the strakes will remain fully retracted regardless of pedal position. The actuators 51 may be electrical, hydraulic, or mechanical devices.

A further embodiment of the present invention includes the use of segmented strakes so as to avoid interference with other aerodynamic surfaces such as a horizontal stabilizer. An open area in the region of the stabilizer avoids tripping stabilizer flow, while the stabilizer itself prevents fuselage circulation from developing side lift.

As previously noted, fuselage forces alone cannot provide complete torque control. An additional means of torque control is required. Torque control requirements are highest during high power operation, that is, during either very low or very high speed flight. During high speed flight, the necessary torque control can be provided by aerodynamic surfaces, such as fins. However, during low speed flight, these surfaces are ineffective. Therefore, a tail thruster is necessary, typically a tail rotor, and this device and associated drive must be sized for the low speed regime. As a result, the tail rotor is larger and heavier than needed in other flight regimes and produces additional drag and power penalties at high speeds. These factors are cumulative and all result in degradation of helicopter performance, in range, payload, maneuverability and economy. The present invention minimizes these factors by reducing the tail rotor or other torque control device requirements.

What is claimed as new and desired to be secured by Letters Patent of the United States is:

1. A helicopter torque control system comprising:
a helicopter;
said helicopter having a main rotor attached thereto;
said helicopter having a fuselage extending rearward through rotor downwash;
helicopter torque control means consisting of a combination of two strake devices, the upper strake being located above the lower strake and both strake devices located only along the side of said fuselage which faces the approaching main rotor blade, for altering rotor downwash, thereby altering lateral aerodynamic force of the fuselage so as to counter main rotor torque; and
supplemental control means to assist in controlling main rotor torque.

2. A helicopter torque control system as in claim 1 wherein the upper strake is located 30° before top dead center of the fuselage and the lower strake is located 30° after bottom dead center of the fuselage.

3. A helicopter torque control system as in claim 1 wherein the supplemental torque control means is a small tail rotor.

4. A helicopter torque control system as in claim 3 wherein the tail rotor disc area is 60%–80% of prior art devices.

5. A helicopter torque control system as in claim 1 wherein the supplemental torquel control means is a reaction device.

6. A helicopter torque control system as in claim 5 wherein the reaction device is jet pressurized by the main engine system.

7. A helicopter torque control system as in claim 1 wherein said helicopter has a horizontal stabilizer located between said upper and lower strakes.

8. A helicopter torque control system as in claim 1 wherein the means of altering downwash over the fuselage is a strake having means for positioning which allows configuring for different flight conditions.

9. A helicopter torque control system as in claim 8 wherein the means of positioning said strake is a hydraulic actuator.

10. A helicopter torque control system as in claim 8 wherein the means of positioning said strake is an electrical actuator.

11. A helicopter torque control system as in claim 8 wherein the means of positioning said strake is a pneumatic actuator.

12. A helicopter torque control system as in claim 8 wherein the means of positioning said strake is a mechanical actuator.

13. A helicopter torque control system comprising a helicopter;
said helicopter having a main rotor blade attached thereto;
said helicopter having a fuselage extending rearward through rotor downwash;
said helicopter having a horizontal stabilizer;
helicopter torque control means consisting of a combination of two strake devices, the upper strake being located above the lower strake and both strake devices located only along the side of said fuselage which faces the approaching main rotor blade, said upper and lower strakes being individually segmented into parts with one part extending from the cabin area of the fuselage to the horizontal stabilizer and the other part extending from the horizontal stabilizer to the aft end of the fuselage boom, thereby altering rotor downwash and altering lateral aerodynamic force on the fuselage so as to counter main rotor torque; and supplemental control means to assist in controlling main rotor torque.

14. A helicopter torque control system as in claim 13 wherein the means of altering downwash over the fuselage is a strake having means for positioning which allows configuring for different flight conditions.

15. A helicopter torque control system as in claim 14 wherein the means of positioning said strake is a hydraulic actuator.

16. A helicopter torque control system as in claim 14 wherein the means of positioning said strake is an electrical actuator.

17. A helicopter torque control system as in claim 14 wherein the means of positioning said strake is a pneumatic actuator.

18. A helicopter torque control system as in claim 14 wherein the means of positioning said strake is a mechanical actuator.

19. A helicopter torque control system as in claim 13 wherein the supplemental torque control means is a small tail rotor.

* * * * *